United States Patent [19]

Mesaki et al.

[11] Patent Number: 5,071,212
[45] Date of Patent: Dec. 10, 1991

[54] OPTICAL FIBER POLARIZER AND PROCESS OF PRODUCTION THEREOF

[75] Inventors: Akitoshi Mesaki, Sagamihara; Norio Suzuki, Yokohama; Tadao Arima; Kouji Okamura, both of Tochigi; Shinya Inagaki, Tokyo, all of Japan

[73] Assignee: Fujitsu Limited, Kawasaki, Japan

[21] Appl. No.: 474,053

[22] PCT Filed: Sep. 13, 1989

[86] PCT No.: PCT/JP89/00937
§ 371 Date: Apr. 27, 1990
§ 102(e) Date: Apr. 27, 1990

[87] PCT Pub. No.: WO90/02966
PCT Pub. Date: Mar. 22, 1990

[30] Foreign Application Priority Data

Sep. 14, 1988 [JP] Japan ................... 63-228524

[51] Int. Cl.⁵ .............................. G02B 6/26
[52] U.S. Cl. ......................... 385/11; 385/43; 385/29
[58] Field of Search ............ 350/96.15, 96.2, 320, 350/370, 373, 394, 395; 264/1.5; 65/3.1, 3.11

[56] References Cited

U.S. PATENT DOCUMENTS 4,586,784 5/1986 Tremblay et al. ........... 264/1.5 X
4,725,113 2/1988 Chang et al. ............... 350/395 X
4,795,233 1/1989 Chang et al. .............. 350/96.15

FOREIGN PATENT DOCUMENTS 34406 2/1983 Japan.
111001 7/1983 Japan.

Primary Examiner—John D. Lee
Assistant Examiner—Stephen W. Barns
Attorney, Agent, or Firm—Staas & Halsey

[57] ABSTRACT

A constricted portion (14) is formed on an optical fiber (6) composed of a core (2) and a clad (4), and one or two belt-like conductive layers (20) elongated in a longitudinal direction of the optical fiber (6) are provided on a surface of the constricted portion (14). With the structure, the device functions as a polarizer which removes a polarized light component having a polarization plane perpendicular to the conductive layers (20). The optical fiber polarizer is suitably inserted in and used with an optical transmission line of an optical communication system and is also suitable for use as a component of an optical isolator.

10 Claims, 9 Drawing Sheets

DATA INPUT

OPTICAL FIBER POLARIZER AND PROCESS OF PRODUCTION THEREOF

DESCRIPTION

1. TECHNICAL FIELD

This invention relates to a polarizer which is used to obtain linearly polarized light having a particular polarization plane and a process of production of the same, and more particularly to an optical fiber polarizer which is obtained by working an optical fiber and is suitably inserted in and used with an optical transmission line of an optical communication system or is suitably used as a component of an optical isolator and also to a process of production of the same.

2. BACKGROUND ART

A polarizer is used to obtain linearly polarized light having a particular polarization plane from other light such as elliptically polarized light than linearly polarized light or is used to obtain a linearly polarized light component from linearly polarized light which is considered to be a combination of two linearly polarized light components having mutually perpendicular polarization planes. Conventionally, the following polarizers are well known as polarizers of the type mentioned:

(a) A polarizer such as a Glan-Thompson prism or a Rochon prism which makes use of the fact that a birefringent crystal has different refractive indices with respect to ordinary and extraordinary rays of light;

(b) A polarizer which makes use of a thin film technique relating to a dielectric multi-layer film or the like such that a beam of light incident to a thin film is separated into two linearly polarized light components having mutually perpendicular polarization planes and one of the two linearly polarized light components passes through the thin film while the other linearly polarized light component is reflected by the thin film; and (c) A polarizer which is composed of a large number of dielectric layers and metal layers laminated in an alternate relationship with each other and absorbs and removes, when a beam of light is introduced in parallel to the planes of the layers into the polarizer, one of linearly polarized light components.

Such polarizers are used to the following applications in the field of optical communications:

(a) In an optical transmitter which includes a light source such as a semiconductor laser which emits in a predetermined condition and an external modulator for intensity modulating light from the light source, where the modulation characteristic of the external modulator is varied in response to a polarization condition of light as in the case of a modulator of the Mach-Zehnder type, a polarizer is provided on the light source side of the external modulator so that linearly polarized light having a particular polarization plane may be introduced into the external modulator in order to stabilize the modulation characteristic of the external modulator.

(b) In an optical communication system, where there is a portion at which there is a gap in refractive index such as a connecting point between optical fibers or an exposed end portion of an optical fiber, light from an optical transmitter is sometimes reflected by the portion and partly returned into the optical transmitter. If such reflected returning light is produced, particularly where the light source is a semiconductor laser, the operation thereof is put into an unstable condition by the reflected returning light. In such an instance, an optical isolator is provided intermediately of an optical transmission line so as to remove reflected returning light. A polarizer is thus used as a component essential to the optical isolator of the type mentioned.

By the way, since a most popular one of optical transmission lines in an optical communication system is an optical fiber, where a polarizer itself or an optical isolator including a polarizer as a component therein is provided in an optical transmission line in any of such applications as described above, it is necessary to cut an intermediate portion of the optical transmission line and provide a parallel light beam system at the location. In other words, while light emitted from an emergent end of one of a pair of cut optical fibers with a predetermined numerical aperture is collimated into a beam by a convex lens and then the beam of light is condensed by another convex lens and introduced to an incident end of the other cut optical fiber, it is necessary to dispose a polarizer at a location of such parallel light beam formed between the two convex lenses. If such parallel light beam system is not constructed, then even if linearly polarized light is extracted from light emitted from the emergent end of the one cut optical fiber using a polarizer, the linearly polarized light cannot be introduced to the incident end of the other cut optical fiber, which is quite far from practical use.

However, even if a parallel optical beam system is constructed, all of light emitted from the emergent end of the one cut optical fiber cannot be introduced to the incident end of the other cut optical fiber due to the presence of an aberration or a diffraction phenomenon of a lens, and an increase of a loss arising from the construction of a parallel light beam system cannot be ignored.

Further, a conventional polarizer has a comparatively large overall size and is not easy to produce because it is used in a parallel light beam system.

DISCLOSURE OF INVENTION

It is an object of the present invention to provide a polarizer which does not provide, when it is inserted in and used with an optical transmission line, such a great loss as provided by a polarizer wherein a parallel light beam system is constructed.

It is another object of the present invention to provide a polarizer which is easy to produce and does not present, when it is inserted in and used with an optical transmission line, such a great overall size as presented by a polarizer wherein a parallel light beam system is constructed.

It is a further object of the present invention to provide a process of producing such polarizer as described above.

According to one aspect of the present invention, there is provided an optical fiber polarizer which comprises an optical fiber composed of a core having a high refractive index and a clad having a low refractive index, a constricted portion formed on the optical fiber, and a belt-like conductive layer provided on a surface of the constricted portion and elongated in a longitudinal direction of the optical fiber.

Preferably, the constricted portion is composed of a pair of tapered portions each having a diameter which continuously decreases from a portion of the optical fiber other than the constricted portion, and a smaller diameter portion interposed between the pair of tapered portions and having a substantially uniform diameter, the tapered portions and the smaller diameter portion having axes which coincide with an axis of the optical fiber.

The tapered portions and the smaller diameter portion may have sectional shapes similar to a sectional shape of any portion of the optical fiber other than the constricted portion.

Preferably, the optical fiber is a single mode optical fiber.

Preferably, the optical fiber is made of glass.

According to a first form, only one such conductive layer is provided such that the longitudinal direction thereof extends in parallel to the axis of the optical fiber.

According to a second form, a pair of such conductive layers are provided at symmetrical locations with respect to the axis of the optical fiber such that the longitudinal directions thereof extend in parallel to the axis of the optical fiber.

Preferably, the conductive layers are made of a metal.

Preferably, the conductive layers are made of aluminum (Al).

Preferably, the conductive layers are made of gold (Au).

According to another aspect of the present invention, there is provided a process of producing such optical fiber polarizer, which comprises a first step of heating an optical fiber composed of a core having a high refractive index and a clad having a low refractive index to partially soften a portion of the optical fiber in a longitudinal direction, a second step of applying a tensile force to the optical fiber to cause plastic deformation of the portion of the optical fiber softened by the first step to form a constricted portion on the optical fiber, a third step of cooling the heated portion of the optical fiber to fix the shape of the constricted portion formed by the second step, and a fourth step of providing, on a surface of the constricted portion the shape of which is fixed by the third step, a belt-like conductive layer elongated in the longitudinal direction of the optical fiber.

BEST MODE FOR CARRYING OUT THE INVENTION

Figure 1:
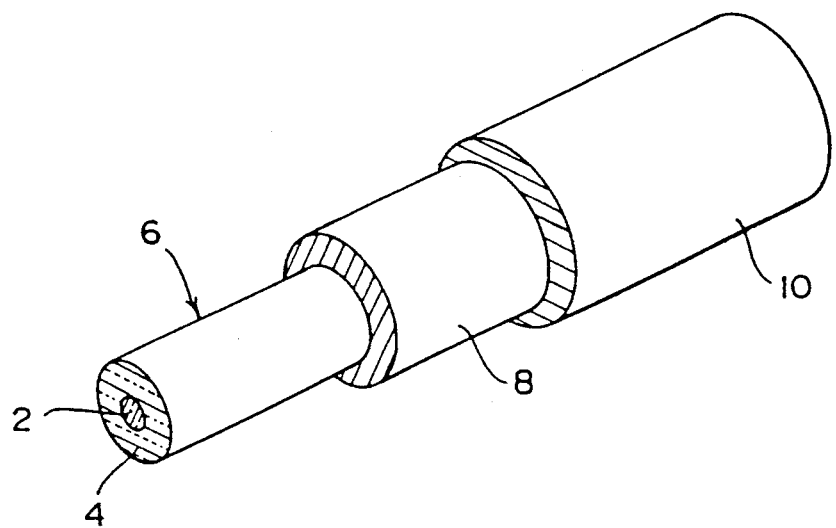
FIG. 1 is a sectional perspective view of an optical fiber which can be used for the production of an optical fiber polarizer of the present invention.

In the following, preferred embodiments of the present invention will be described in detail with reference to the drawings wherein like parts are denoted by like reference characters all through the figures.

FIG. 1 is a sectional perspective view of part of an optical fiber which can be used for the production of an optical fiber polarizer according to the present invention. An optical fiber 6 is composed of a core 2 having a high refractive index and a clad 4 having a low refractive index and is coated therearound with a buffer layer 8, and a coating 10 is provided on an outer periphery of the buffer layer 8. The buffer layer 8 is made of, for example, a silicone resin while the coating 10 is made of a thermoplastic resin such as nylon. The optical fiber 6 is obtained by forming a preform, for example, in accordance with an MCVD (Modified Chemical Vapor Deposition) method using quartz glass ($SiO_2$) and then by melting and spinning the preform.

Figure 2:
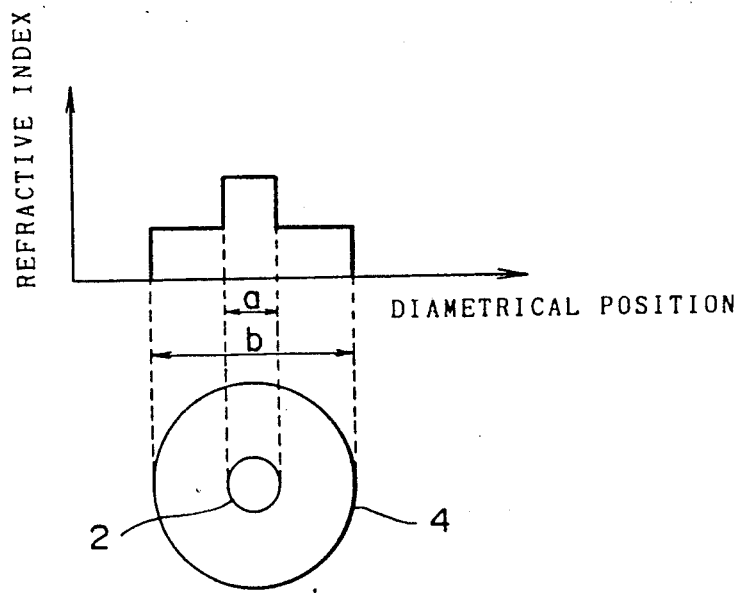
FIG. 2 is a diagrammatic representation illustrating a refractive index distribution and so forth of the optical fiber shown in FIG. 1.

FIG. 2 shows a refractive index distribution with respect to the position of the optical fiber of FIG. 1 in a diametrical direction. The refractive index of the core 2 is set higher than the refractive index of the clad 4, and the relative refractive index difference $\Delta$ between them is, for example, 0.2 to 0.3%. Adjustment of the refractive index of the core 2 or the clad 4 to such value can be achieved by adjusting the amount of a dopant such as $B_2O_3$, $P_2O_5$, $GeO_2$ or the like upon formation of the preform as described above. It is to be noted that the diameter a of the core 2 is 10 μm in the present example, and the diameter b of the clad 4 is 125 μm in the present example.

Figure 3A:
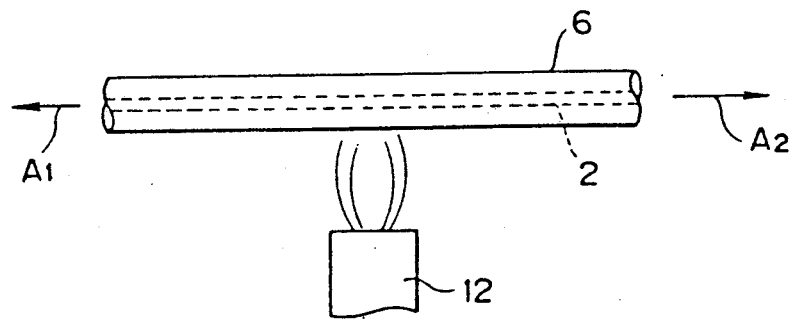
FIG. 3A is schematic illustrations of different steps of production of an optical fiber polarizer showing an embodiment of the present invention.
Figure 3B:
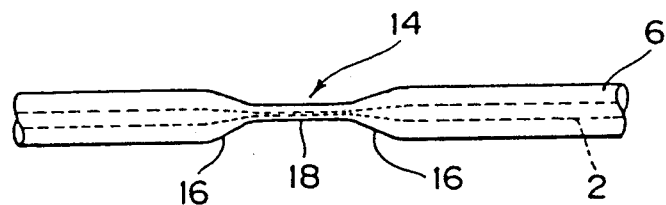

FIGS. 3A and 3B are schematic illustrations showing a process of forming a constricted portion on an optical fiber.

First, an optical fiber 6 is heated by means of a burner 12 such as an oxyhydrogen burner as shown in FIG. 3A to partially soften a longitudinal portion of the optical fiber 6. Heating of the optical fiber 6 may otherwise be carried out by means of a discharge which may be produced between arc discharge electrodes.

Subsequently, a tensile force is applied to the optical fiber 6 in the directions (axial directions of the fiber 6) indicated by arrow marks $A_1$ and $A_2$ in FIG. 3A to cause plastic deformation of the partially softened portion of the optical fiber 6 to form a constricted portion 14 on the optical fiber 6.

Then, the heated and softened portion of the optical fiber 6 is cooled to fix the shape of the constricted portion 14. The cooling method in this instance preferably relies upon gradual cooling so that high thermal stress may not remain in the optical fiber 6, and to this end, a method is suitable wherein a heated optical fiber is left in stationary air.

The constricted portion 14 the shape of which has been fixed in this manner includes a pair of tapered portions 16 which continuously decrease in diameter from any portion of the optical fiber 6 other than the constricted portion 14, and a smaller diameter portion 18 interposed between the pair of tapered portions 16 and having a substantially uniform diameter. According to the process of production of the constricted portion 14 described above, axes of the tapered portions 16 and the smaller diameter portion 18 can be made coincide with an axis of the optical fiber 6, and consequently, the propagation loss of light by the optical fiber 6 can be minimized. It is to be noted that the sectional shapes of the tapered portions 16 and the smaller diameter portion 18 are similar to the sectional shape of any portion of the optical fiber 6 other than the constricted portion 14.

When it is attempted to form a constricted portion at an intermediate portion of an optical fiber by heating, it is necessary that the optical fiber be put into a softened condition by heating, and accordingly, glass is suitable as a material of the optical fiber.

Figure 4:
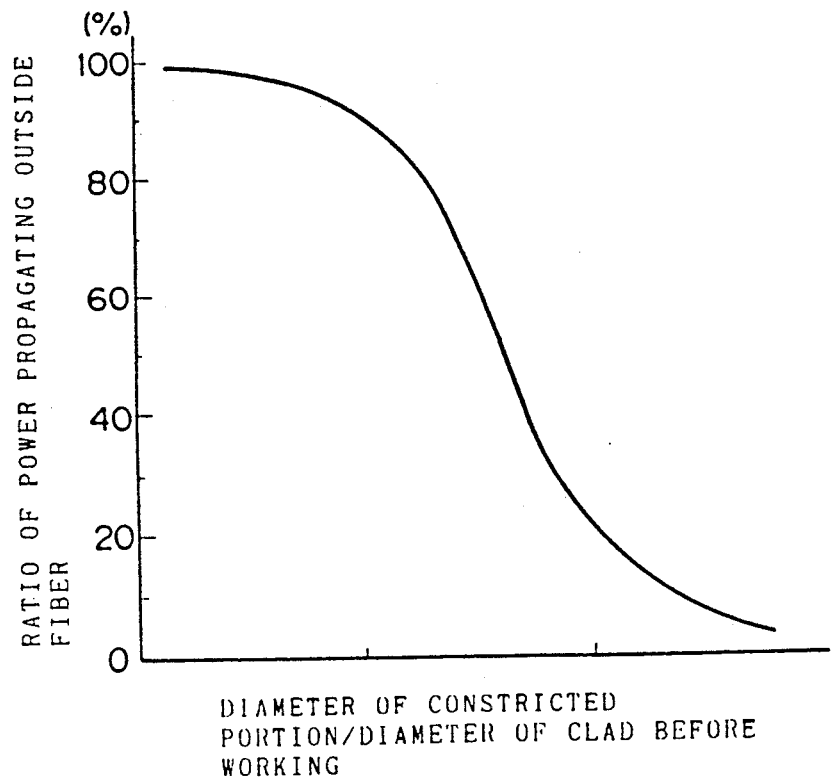
FIG. 4 is a graph illustrating a relationship between a ratio to an entire power of a power of light which propagates, where a constricted portion is formed on an optical fiber in the embodiment of the present invention, on the outside of the constricted portion and a value obtained by dividing a diameter of the constricted portion by a diameter of a clad.

FIG. 4 is a graph showing a variation of a ratio to an entire power of a power of light which propagates on the outside of the constricted portion 14 of the optical fiber 6 when the ratio of the outer diameter of the constricted portion 14 to the outer diameter of any portion of the optical fiber 6 other than the constricted portion 14 (diameter of the clad) is varied. As the ratio to the outer diameter decreases, the ratio of the power of light which propagates on the outside of the portion of the optical fiber 6 increases. Accordingly, it is possible to remove, at the constricted portion 14 of the optical fiber 6, a particular polarized light component by providing a conductive layer on the constricted portion 14. It is to be noted that the wave guiding principle of light in a single mode optical fiber depends upon the fact that propagating light is confined near to the core depending upon a difference in refractive index between the core and the clad. Also at the constricted portion of the optical fiber, a wave is guided similarly because propagating light is confined near to a core corresponding portion depending upon a difference in refractive index between the core corresponding portion and a clad corresponding portion. In this instance, however, because the diameter of the core corresponding portion is small, the confining action of light is low, and consequently, the mode field is expanded. Accordingly, even if the power of light which propagates, at the constricted portion, on the outside of the constricted portion increases, this does not lead directly to a loss.

In order to remove a particular polarized light component of propagating light in an optical fiber, either a belt-like conductive layer which is elongated in the longitudinal direction of the optical fiber is provided on a surface of the constricted portion 14 (first manner) or two such conductive layers are provided on a surface of the constricted portion 14 (second manner).

Figure 5:
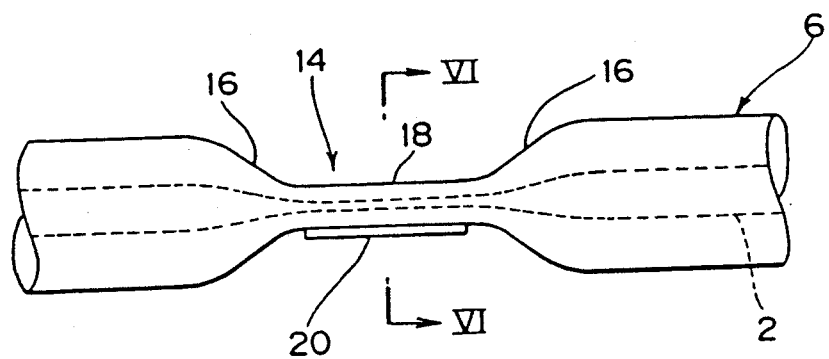
FIG. 5 is a front elevational view of an optical fiber polarizer according to a first embodiment of the present invention.
Figure 6:
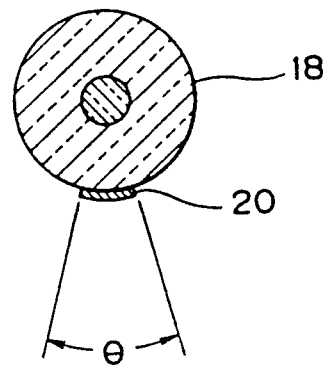
FIG. 6 is a sectional view taken along line VI—VI of FIG. 5.

FIG. 5 is a front elevational view of an optical fiber polarizer illustrating the first manner, and FIG. 6 is a sectional view taken along line VI—VI of FIG. 5. A conductive layer 20 which is elongated like a belt in a longitudinal direction of an optical fiber 6 is provided on a smaller diameter portion 18 of the optical fiber 6 such that the longitudinal direction thereof may extend in parallel to an axis of the optical fiber 6. With the construction, the optical fiber 6 can efficiently attenuate a polarized light component having a polarization plane (a plane containing an electric field vector) perpendicular to a plane of the conductive layer, thereby exhibiting a function of a polarizer. If the angle θ subtended by the conductive layer 20 with respect to the center of the fiber is excessively small, then a polarized light component having a polarization plane perpendicular to the conductive layer is not attenuated sufficiently, but on the contrary if the angle θ is excessively great, then the transmission factor for a polarized light component having a polarization plane parallel to the conductive layer is low, and the loss is great. Accordingly, the angle θ is suitably set to 30 degrees or so.

Since the polarizer is formed directly on the optical fiber, the compatibility with the optical fiber is high. Accordingly, the optical fiber polarizer is suitable for the reduction in loss and also for the miniaturization.

Figure 7:
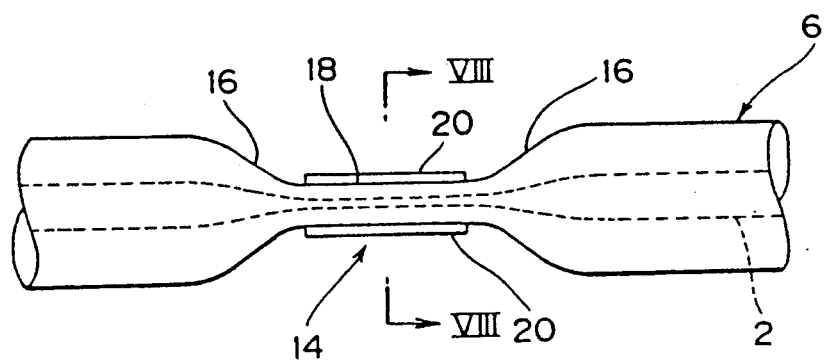
FIG. 7 is a front elevational view of an optical fiber polarizer according to a second embodiment of the present invention.
Figure 8:
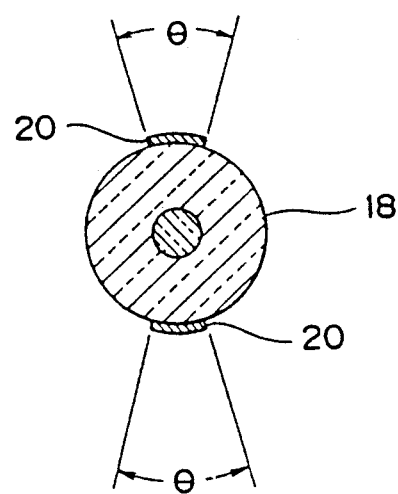
FIG. 8 is a sectional view taken along line VIII—VIII of FIG. 7.

FIG. 7 is a front elevational view of an optical fiber polarizer illustrating the second manner, and FIG. 8 is a sectional view taken along line VIII—VIII of the optical fiber polarizer of FIG. 7. In the present embodiment, a pair of such conductive layers 20 as described hereinabove with reference to FIGS. 5 and 6 are provided at symmetrical locations on an optical fiber 6 with respect to an axis of the optical fiber 6. Then, the angle θ subtended by each of the conductive layers 20 with respect to the center of the fiber is set to 30 degrees or so similarly to that of the preceding embodiment. Since the construction allows effective attenuation of a polarized light component having a polarization plane perpendicular to the conductive layers, the length of a smaller diameter portion 14 of the optical fiber 6 can be reduced, which permits further miniaturization of the optical fiber polarizer. Further, an optical fiber polarizer having a high extinction coefficient can be provided.

Since principles of removal of a polarized light component having a particular polarization plane are common to the first and second embodiments, a principle of the second embodiment will be described.

Figure 9:
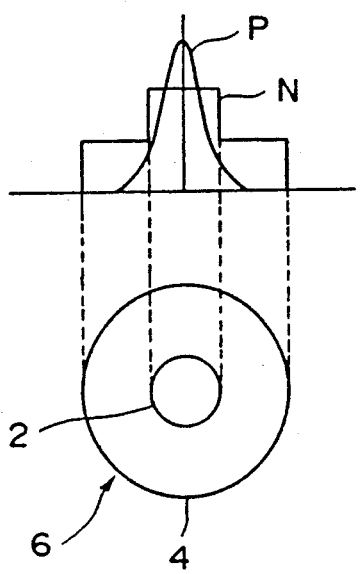
FIG. 9 is a diagrammatic representation showing a refractive index distribution and an intensity distribution of propagating light at a portion of the optical fiber polarizer shown in FIGS. 5 and 6 or FIGS. 7 and 8 at which no constricted portion is formed.

FIG. 9 is a view illustrating distributions of a refractive index and an intensity of light at a portion of the optical fiber 6 at which the constricted portion 14 is not formed. The refractive index N is high at a portion corresponding to the core 2 but is low at a portion corresponding to the clad 4 around the core 2. In this instance, the distribution of the light intensity P makes a Gaussian distribution wherein it extends from a central portion at which the refractive index is high to another portion at which the refractive index is low, and a mode field wherein light is concentrated at a central portion is formed.

Accordingly, the propagation loss is low irrespective of a polarization direction.

Figure 10:
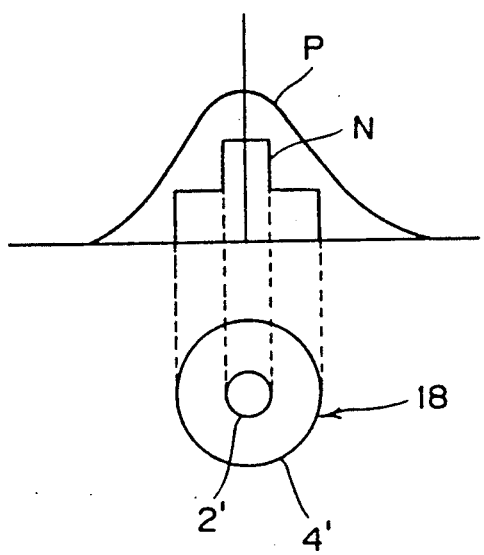
FIG. 10 is a diagrammatic representation showing a refractive index distribution and an intensity distribution of propagating light at the constricted portion of the optical fiber polarizer shown in FIGS. 5 and 6 or FIGS. 7 and 8 before a conductive layer is formed on the constricted portion.

FIG. 10 is a view illustrating distributions of a refractive index and a light intensity in a sectional area of the constricted portion 14 of the optical fiber 6 before the conductive layers 20 are formed. The distribution of the refractive index N is similar to that of FIG. 9, and in this instance, the distribution of the light intensity P substantially makes a Gaussian distribution wherein it extends from a central portion corresponding to the core corresponding portion 2' at which the refractive index is high, but a mode field is formed to extend to the outside of portions corresponding to the clad corresponding portion 4' at which the refractive index is low. Accordingly, the propagation does not vary depending upon a polarizing direction.

Figure 11:
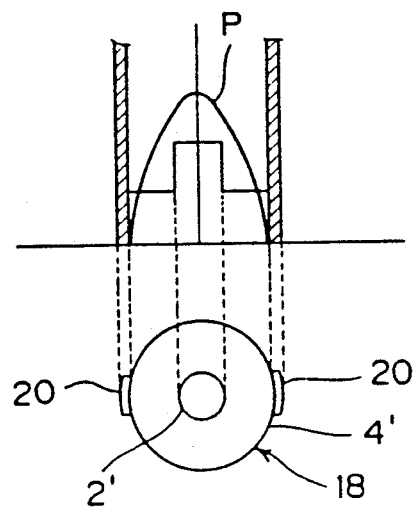
FIG. 11 is a diagrammatic representation showing a refractive index distribution and an intensity distribution of propagating light at the constricted portion of the optical fiber polarizer shown in FIGS. 7 and 8 after conductive layers is formed on the constricted portion.

FIG. 11 is a view illustrating distributions of a refractive index and a light intensity in a sectional area of the constricted portion 14 after the conductive layers 20 are formed. If an examination is made only of a direction of a plane including the conductive layers 20, then since the conductive layers 20 exist, in the direction, adjacent the clad corresponding portion 4' at the constricted portion 18, the electric field component is zero at the portion. Accordingly, the propagation loss of a polarized light component having a polarization plane in the direction of the plane including the conductive layers 20, that is, in a direction perpendicular to the conductive layers 20 is great. With regard to another polarized light component having a polarization plane parallel to the conductive layers 20, the propagation loss is not great as described hereinabove with reference to FIG. 10. Only one of two polarized light components having mutually perpendicular polarization planes is attenuated to a great degree, and accordingly, a function as a polarizer is achieved.

In order to minimize the loss, the optical power blotted out to the outside of the clad corresponding portion 4' of the constricted portion 14 must be introduced effectively as it is into the core 2 at any other portion of the optical fiber 6 other than the constricted portion 14. Accordingly, in this sense, the optical fiber is preferably a single mode optical fiber in which only light of a single mode can propagate.

The conductive layers 20 can be formed from metal films, and in this instance, the conductive layers 20 can be formed using such a method as sputtering, vapor deposition or the like. Where aluminum having a complex dielectric constant wherein the imaginary number portion is great is used as a material of the conductive layers 20, the extinction coefficient when the length of portions of the constricted portion on which the conductive layers are formed is constant can be raised. Meanwhile, where gold is used as a material of the conductive layers 20, an optical fiber polarizer having a high durability can be provided.

Using a single mode optical fiber wherein the diameter of the clad is 125 $\mu$m, a constricted portion was formed on the optical fiber such that the diameter of the smaller diameter portion 18 thereof was 20 $\mu$m and the length of a portion having a diameter smaller than 30 $\mu$m was 10 mm, and then a pair of conductive layers 20 made of aluminum were formed on the opposite sides of the smaller diameter portion 18 of the optical fiber as shown in FIGS. 7 and 8. As a result, an optical fiber polarizer having an extinction coefficient of 30 dB was obtained. In order to reduce the loss, the taper ratio (changing ratio of the diameter) of the tapered portions 16 should be reduced. Where such taper ratio was adopted that the distance over which the diameter reduced from 125 $\mu$m to 20 $\mu$m was 10 mm, the resulted loss was 0.5 dB.

Figure 12:
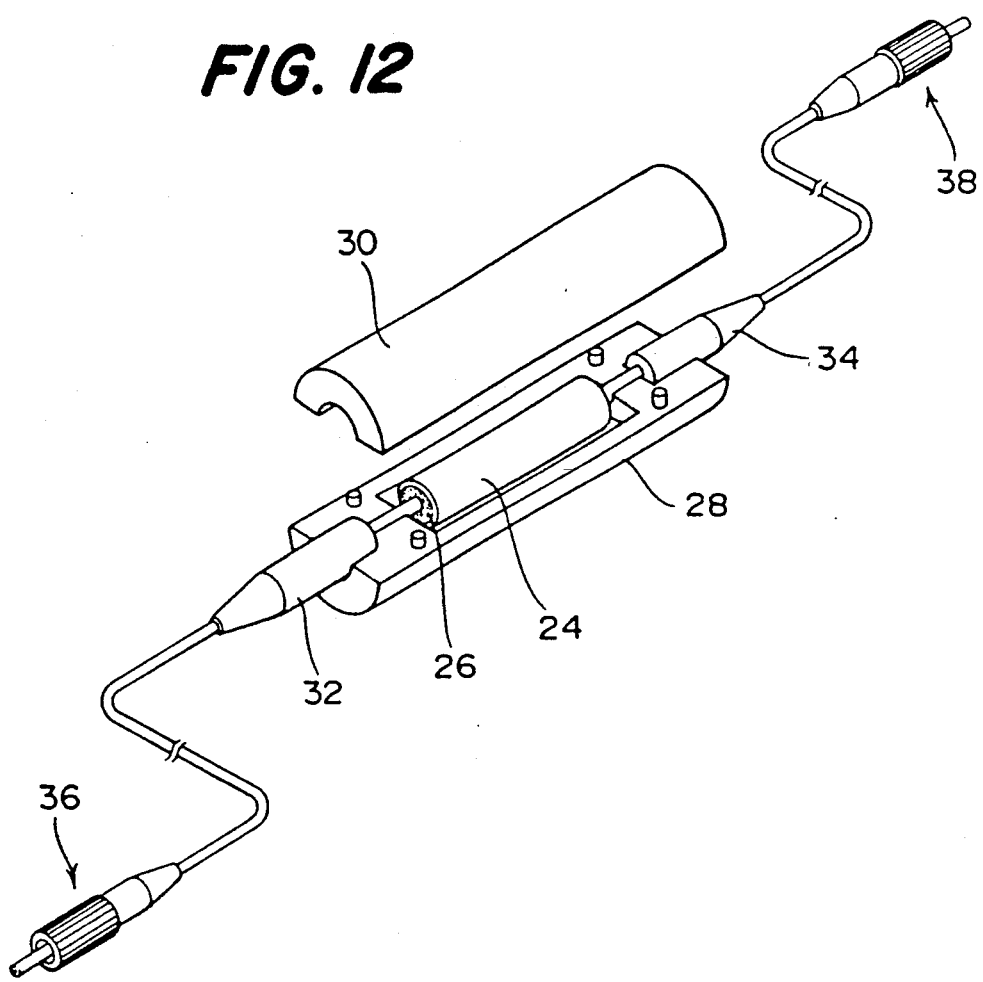
FIG. 12 is a fragmentary perspective view of an optical fiber polarizer module which is constructed using the optical fiber polarizer shown in FIGS. 7 and 8.
Figure 13:
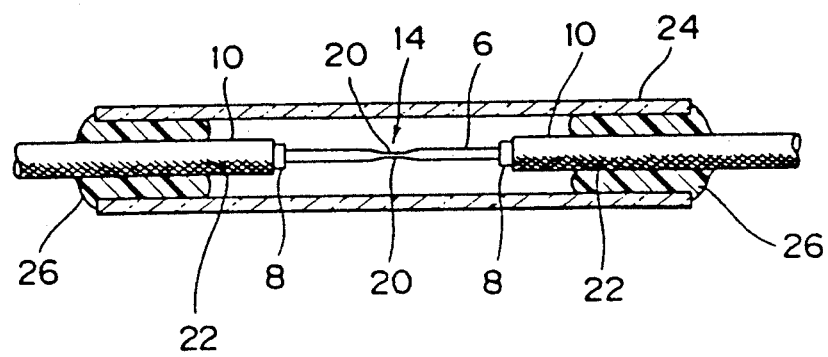
FIG. 13 is a vertical sectional view of part of the modlue shown in FIG. 12.

FIG. 12 is a fragmentary perspective view of an optical fiber polarizer module which is constructed using such an optical fiber polarizer as shown in FIGS. 7 and 8, and FIG. 13 is a sectional view of a principal portion of the optical fiber polarizer module shown in FIG. 12. While an optical fiber polarizer is formed at a portion of an optical fiber from which the buffer layer 8 and the coating 10 are partially removed, since it has a diameter of about 10 $\mu$m at a thinnest portion thereof, it is very weak in mechanical strength. Besides, it is necessary to prevent a change in quality of each conductive layer and to prevent a change in refractive index of a clad corresponding portion which arises from sticking of water or the like to the constricted portion. Accordingly, a package is required for assuring mechanical reinforcement and airtight sealing. In the present example, scratches 22 are formed on the coating 10 of an optical fiber by means of sand paper or the like, and a portion of the optical fiber at which a polarizer is formed is accommodated in a glass pipe 24, and the optical polarizer module is airtight sealed at portions of the coating 10 on which the scratches 22 are formed, using a bonding agent 26. Then, in order to achieve protection of the glass pipe 24, the glass pipe 24 is accommodated in packages 28 and 30 made of a plastic material or the like, and a pair of optical connectors 36 and 38 are connected to the opposite ends of the optical fiber. Reference numerals 32 and 34 denote rubber bushes for preventing an excessive bend of a portion of the optical fiber which extends outwardly from the packages 28 and 30. With the module having such a construction as described above, even if a tensile stress or the like is applied to the optical fiber from the outside, there is no possibility that the optical fiber polarizer having a low mechanical strength may be broken. Further, where gas of $N_2$ or the like is enclosed in the glass pipe 24, a possible change in quality of the conductive layers and dew condensation of water on the constricted portion can be prevented. Besides, since the constricted portion is prevented from being deformed by an external force, the characteristic of the optical fiber polarizer is stabilized.

Figure 14:
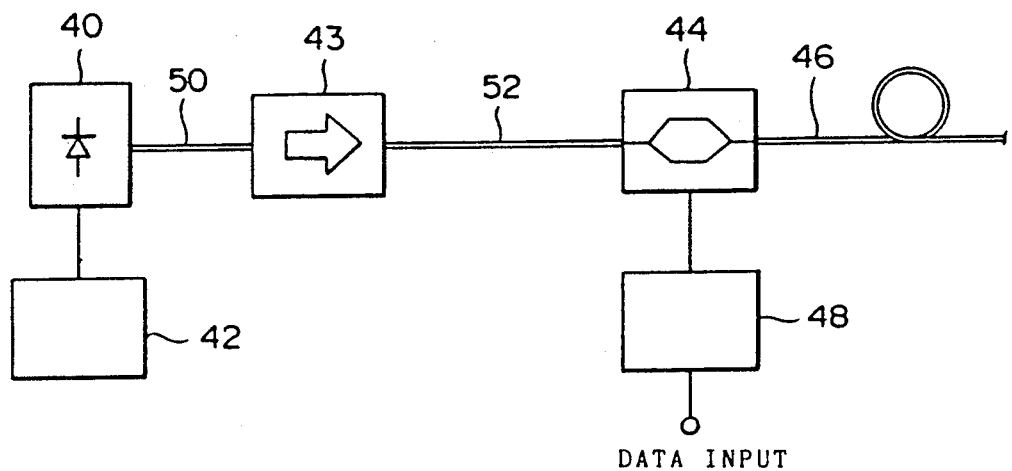
FIG. 14 is a block diagram of an optical transmitter to which the optical fiber polarizer shown in FIGS. 7 and 8 can be applied suitably.

FIG. 14 is a block diagram of an optical transmitter which is constructed applying the present invention. The optical transmitter is of the external modulation type. The optical transmitter includes a semiconductor laser 40 for outputting light of a fixed intensity, a driver circuit 42 for the semiconductor laser 40, an optical isolator 43 for transmitting light from the semiconductor laser 40 in a forward direction (in the direction indicated by an arrow mark in FIG. 14) and for removing reflected returning light in the opposite direction, an optical modulator 44 of the Mach-Zehnder type for intensity modulating light of a fixed intensity from the optical isolator 43 and forwarding the thus intensity modulated light into an optical fiber 46 serving as an optical transmission line, and a modulator circuit 48 for varying a driving voltage for the optical modulator 44 in response to a data input signal to cause intensity modulation. The semiconductor laser 40 and optical isolator 43 are interconnected by way of an optical fiber 50 while the optical isolator 43 and optical modulator 44 are interconnected by way of another optical fiber 52.

With the optical transmitter having such a construction as described above, if the polarization condition of light to be inputted to the optical modulator 44 is not fixed, then stable intensity modulation cannot be effected, and accordingly, a polarizer is normally disposed either between the optical fiber 52 and the optical modulator 44 or at an intermediate portion of the optical fiber 52 adjacent the optical modulator 44 so that light to be inputted to the optical modulator 44 may be linearly polarized light having a particular polarization plane.

Figure 15:
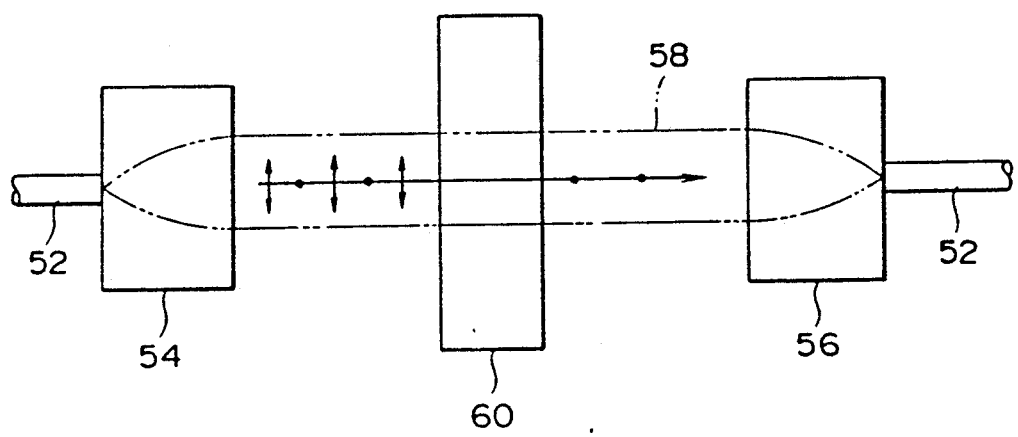
FIG. 15 is a diagrammatic representation showing construction of a conventional polarizer module which may be inserted in an optical communication line.

Construction of a conventional polarizer which is used to such an application as described above is shown in FIG. 15. A pair of lenses 54 and 56 such as condensing rod lenses are disposed intermediately of the optical fiber 52 into which a polarizer is to be inserted so that a parallel light beam system 58 may be formed, and a polarizer 60 is provided such that it may act upon such parallel light beam. Where the polarizer of such construction is employed, a sufficiently high extinction coefficient can be obtained, but since light of an optical fiber propagating mode is converted once into a space light beam, the loss is great. On the other hand, where an optical fiber polarizer of the present invention is used, a particular polarized light component can be removed while the light remains in an optical fiber propagating mode, and consequently, the loss is small.

In the meantime, a polarizer is commonly used as a component of the optical isolator 43. Accordingly, the present invention can be applied also to the part.

Figure 16:
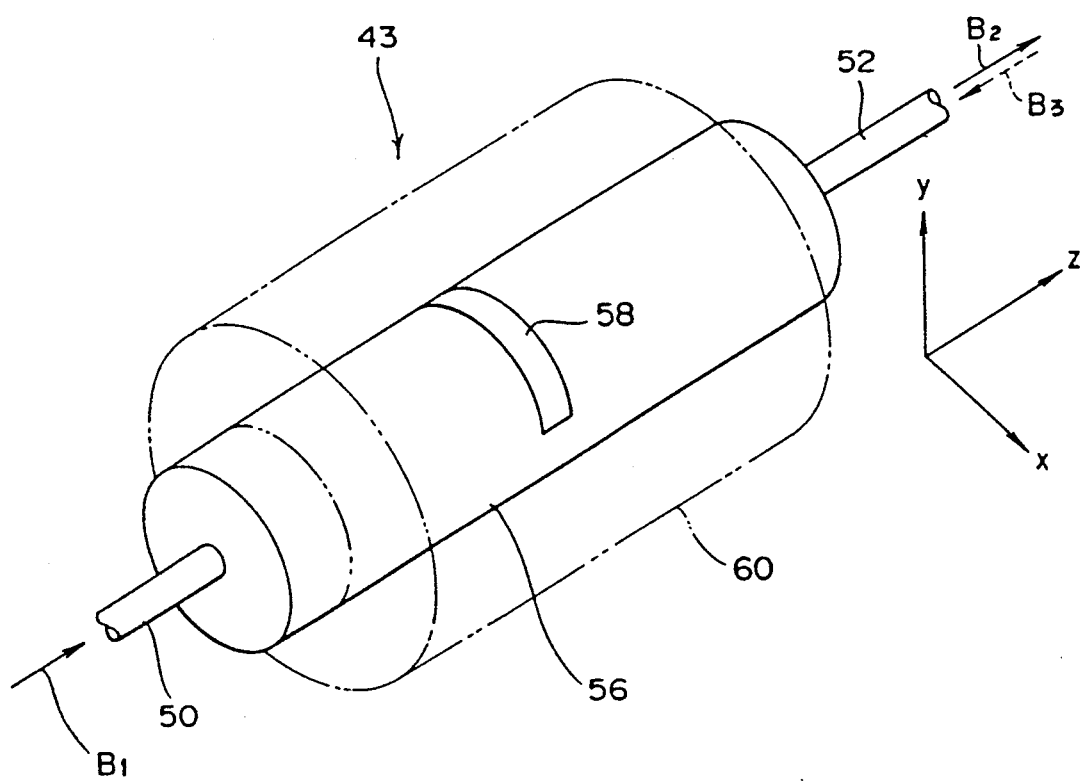
FIG. 16 is a perspective view of an optical isolator which is constructed using the optical fiber polarizer shown in FIGS. 7 and 8.
Figure 17:
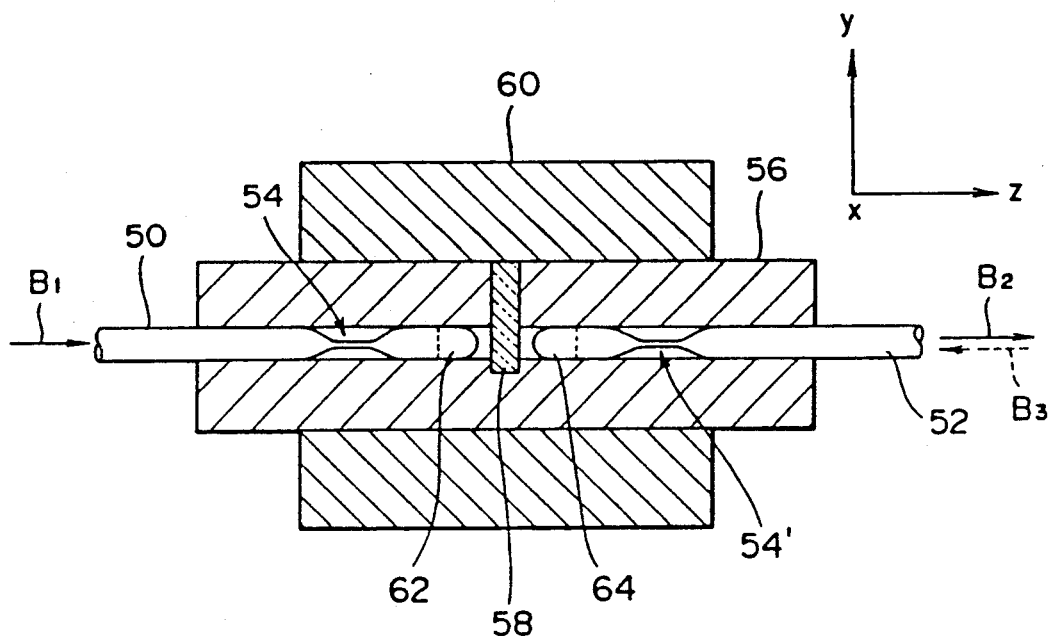
FIG. 17 is a vertical sectional view of the optical isolator shown in FIG. 16.

FIG. 16 is a perspective view of an optical isolator which is constructed applying an optical fiber polarizer of the present invention, and FIG. 17 is a vertical sectional view of the optical isolator of FIG. 16. Optical fiber polarizers 54 and 54' are formed at an end portion of an optical fiber 50 on the input side and an end portion of another optical fiber 52 on the output side, respectively, and fiber lenses 62 and 64 are provided at ends of the optical fiber polarizers 54 and 54', respectively. Each of the fiber lenses 62 and 64 is formed based on a multi-mode optical fiber having the same outer diameter as the outer diameter of the optical fibers 50 and 52 and has a lens function portion of a predetermined curvature formed at an end portion thereof by an action of a surface tension which appears when the end thereof is heated into a molten condition. The optical fibers 50 and 52 having the optical fiber polarizers and the fiber lenses formed thereon in this manner are inserted in and secured to fiber insertion holes of a cylindrical ferrule 56 from the opposite sides of the ferrule 56. A Faraday rotator 58 is securely mounted in a recess formed in a wall of the ferrule 56 perpendicular to the fiber insertion holes such that light outputted from the optical fiber 50 on the input side by way of the optical fiber polarizer 54 and the fiber lens 62 transmits through the Faraday rotator 58 and is then introduced into the optical fiber polarizer 54' and the optical fiber 52 by way of the other fiber lens 64. Reference numeral 60 denotes a cylindrical permanent magnet provided on an outer periphery of the ferrule 56. The permanent magnet 60 applies a predetermined magnetic field to the Faraday rotator 58 on the optical axis to optically rotate the transmission light through the Faraday rotator 58 by an angle of 45 degrees.

Figure 18:
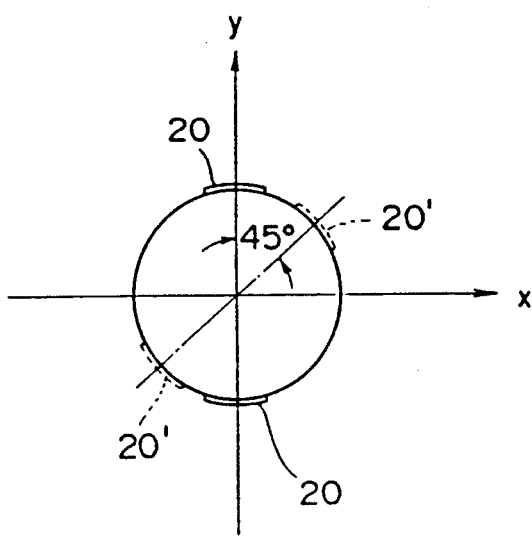
FIG. 18 is a diagrammatic representation showing locations at which conductive layers are formed at the constricted portion of the optical fiber polarizer employed in the optical isolator shown in FIGS. 16 and 17.

Now, it is assumed that a rectangular three-dimensional coordinate system (x, y, z) wherein the center axes of the optical fibers 50 and 52 coincide with the z axis and the propagating direction of light which propagates in the direction indicated by an arrow mark $B_1$ in the optical fiber 50 is directed in the positive direction of the z axis. It is also assumed that the y axis extends through the conductive layers 20 of the optical fiber polarizer 54 on the input side as shown in FIG. 18. In this instance, the conductive layers 20' of the optical fiber polarizer 54' on the output side are located at such positions as rotated by 45 degrees in the direction of optical rotation of light by the Faraday rotator 58 (in the clockwise direction in the present example) facing in the positive direction of the z axis. With the arrangement, linearly polarized light which transmits through the optical fiber polarizer 54 on the input side and has a polarization plane parallel to the x-z plane is rotated by the Faraday rotator 56 and passes through optical fiber polarizer 54' on the output side. Consequently, the linearly polarized light is outputted in the direction indicated by an arrow mark $B_2$ without suffering from a great loss. On the other hand, reflected returning light which propagates in the direction indicated by an arrow mark $B_3$ is converted into linearly polarized light by the optical fiber polarizer 54' on the output side. However, after the linearly polarized light is subsequently rotated by the Faraday rotator 58, it has a polarization plane parallel to the y-z plane. Consequently, the linearly polarized light cannot transmit through the optical fiber polarizer 54 on the input side in the negative direction of the z axis, and accordingly, such returning light is removed and the function as an optical isolator is attained.

The material of the Faraday rotator 58 may be crystal of YIG (yttrium.iron.garnet) or gadolinium.iron.garnet ($Gd_{3-x}Bi_xFe_5O_{12}$) wherein gadolinium is substituted by a large amount of bismuth (Bi). In case the latter is used, the thickness of crystal required to obtain an angle of optical rotation of 45 degrees can be made smaller than that of the case wherein the former is used, and an optical isolator of a small size which is small in loss can be provided.

INDUSTRIAL APPLICABILITY

As described above, an optical fiber polarizer of the present invention can be inserted in and used with an optical transmission line of an optical communication system or is suitable for use as a component of an optical isolator.

We claim:

1. An optical fiber polarizer, comprising
   an optical fiber (6) composed of a core (2) having a high refractive index and a clad (4) having a low refractive index,
   a constricted portion (14) formed on said optical fiber (6), and
   a belt-like conductive layer (20) provided on a surface of said constricted portion (14) and elongated in a longitudinal direction of said optical fiber (6), wherein said constricted portion (14) is composed of a pair of tapered portions (16) each having a diameter which continuously decreases from a portion of said optical fiber (6) other than said constricted portion (14), and a smaller diameter portion (18) interposed between said pair of tapered portions (16) and having a substantially uniform diameter, said portions (16) and said smaller diameter portion (18) having axes which coincide with an axis of said optical fiber (6).

2. An optical fiber polarizer according to claim 1, wherein said tapered portions (16) and said smaller diameter portion (18) have sectional shapes similar to a sectional shape of any portion of said optical fiber (6) other than said constricted portion (14).

3. An optical fiber polarizer according to claim 2, wherein said optical fiber (6) is a single mode optical fiber.

4. An optical fiber polarizer according to claim 3, wherein said optical fiber (6) is made of glass.

5. An optical fiber polarizer according to claim 4, wherein only one such conductive layer (20) is provided such that the longitudinal direction thereof extends in parallel to the axis of said optical fiber (6).

6. An optical fiber polarizer according to claim 4, wherein a pair of such conductive layers (20) are provided at symmetrical locations with respect to the axis of said optical fiber (6) such that the longitudinal directions thereof extend in parallel to the axis of said optical fiber (6).

7. An optical fiber polarizer according to claim 6, wherein said conductive layers (20) are made of a metal.

8. An optical fiber polarizer according to claim 7, wherein said conductive layers (20) are made of aluminum (Al).

9. An optical fiber polarizer according to claim 7, wherein said conductive layers (20) are made of gold (Au).

10. A process of producing an optical fiber polarizer, comprising
a first step of heating an optical fiber (6) composed of a core (2) having a high refractive index and a clad (4) having a low refractive index to partially soften a portion of said optical fiber (6) in a longitudinal direction,
a second step of applying a tensile force to said optical fiber (6) to cause plastic deformation of the portion of said optical fiber (6) softened by the first step to form a constricted portion (14) on said optical fiber (6),
a third step of cooling the heated portion of said optical fiber (6) to fix the shape of said constricted portion (14) formed by the second step, and
a fourth step of providing, on a surface of said constricted portion (14) the shape of which is fixed by the third step, a belt-like conductive layer (20) elongated in the longitudinal direction of said optical fiber (6).

* * * * *

UNITED STATES PATENT AND TRADEMARK OFFICE
CERTIFICATE OF CORRECTION

PATENT NO. : 5,071,212
DATED : December 10, 1992
INVENTOR(S) : Akitoshi Mesaki, et al It is certified that error appears in the above-indentified patent and that said Letters Patent is hereby corrected as shown below:

Col. 1, line 47 should be aligned properly under line 46;

Col. 3, line 54, "FIG. 3A is" should be --FIGS. 3A and 3B are--;

Col. 6, line 1, delete "a";

Signed and Sealed this

Twenty-fifth Day of January, 1994

Attest:

BRUCE LEHMAN

*Attesting Officer*     *Commissioner of Patents and Trademarks*